(12) United States Patent
An et al.

(10) Patent No.: US 9,216,914 B2
(45) Date of Patent: Dec. 22, 2015

(54) WATER FILTER DEVICE AND REFRIGERATOR HAVING THE SAME

(71) Applicant: SAMSUNG ELECTRONICS CO., LTD., Suwon-si, Gyeonggi-do (KR)

(72) Inventors: Jae Koog An, Gwangju (KR); Sang Min Park, Gwangju (KR); Young Gwi Park, Gwangju (KR); Jong Yeob Kim, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/793,585

(22) Filed: Jul. 7, 2015

(65) Prior Publication Data

US 2015/0307366 A1 Oct. 29, 2015

Related U.S. Application Data

(63) Continuation of application No. 14/694,162, filed on Apr. 23, 2015, which is a continuation of application No. 12/805,095, filed on Jul. 12, 2010, now Pat. No. 9,046,299, which is a continuation-in-part of application No. 12/654,627, filed on Dec. 28, 2009, now Pat. No. 9,115,920.

(30) Foreign Application Priority Data

Jan. 7, 2009 (KR) .................. 10-2009-0001238
Aug. 6, 2009 (KR) .................. 10-2009-0072280

(51) Int. Cl.
*F25D 3/02* (2006.01)
*C02F 1/00* (2006.01)
(Continued)

(52) U.S. Cl.
CPC ............... *C02F 1/003* (2013.01); *B01D 35/02* (2013.01); *B01D 35/147* (2013.01); *C02F 2307/10* (2013.01); *C02F 2307/12* (2013.01)

(58) Field of Classification Search
CPC .......... F25D 23/126; F25D 3/04; F25D 19/02; B01D 2201/0145
USPC ................... 62/318, 339, 340, 347, 389, 448; 220/146.2
See application file for complete search history.

(56) References Cited

U.S. PATENT DOCUMENTS 3,035,418 A * 5/1962 Wright .................. E03B 3/28
                                                         62/173
3,982,406 A   9/1976 Hanson et al.
(Continued)

FOREIGN PATENT DOCUMENTS

CN    2289787 Y    9/1998
CN    1548889 A    11/2004
(Continued)

OTHER PUBLICATIONS

U.S. Office Action issued May 23, 2013 in corresponding U.S. Appl. No. 12/654,627.
(Continued)

*Primary Examiner* — Melvin Jones
(74) *Attorney, Agent, or Firm* — Staas & Halsey LLP

(57) ABSTRACT

A refrigerator includes a cabinet to define an outer appearance of the refrigerator and having a storage chamber therein; and a water filter device installed in the storage chamber, to purify water supplied from an external water supply source. The water filter device includes a filter unit to purify the water supplied from the water supply source, a storage tank unit to store the water purified through the filter unit, a case to accommodate the filter unit and the storage tank unit, a filter head assembly, and a water filter assembly separably coupled to the filter head assembly.

14 Claims, 15 Drawing Sheets

(51) Int. Cl.
  *B01D 35/02* (2006.01)
  *B01D 35/147* (2006.01)

(56) References Cited

U.S. PATENT DOCUMENTS

| | | | |
|---|---|---|---|
| 4,808,302 A | 2/1989 | Beall, Jr. | |
| 5,135,645 A | 8/1992 | Sklenak et al. | |
| 5,290,442 A | 3/1994 | Clack | |
| 5,707,518 A | 1/1998 | Coates et al. | |
| 5,813,246 A * | 9/1998 | Oh | B67D 1/0835 137/614.04 |
| 6,003,734 A * | 12/1999 | Oh | B67D 3/0003 141/351 |
| 6,182,453 B1 | 2/2001 | Forsberg | |
| 6,532,758 B2 | 3/2003 | DuHack | |
| 6,574,984 B1 | 6/2003 | McCrea et al. | |
| 2006/0080991 A1 | 4/2006 | An et al. | |
| 2006/0081805 A1 | 4/2006 | Olson et al. | |
| 2006/0196212 A1 | 9/2006 | Jenkins, Jr. et al. | |
| 2008/0047889 A1 | 2/2008 | Huda | |
| 2008/0142431 A1 | 6/2008 | Lim et al. | |
| 2008/0156015 A1 | 7/2008 | Meyerholtz et al. | |
| 2010/0126210 A1 | 5/2010 | Rotter et al. | |

FOREIGN PATENT DOCUMENTS

| | | |
|---|---|---|
| EP | 1939560 | 7/2008 |
| JP | 05-280855 | 10/1993 |
| JP | 2005-308323 | 11/2005 |
| KR | 10-2004-0085403 | 10/2004 |
| KR | 10-0843152 | 7/2008 |

OTHER PUBLICATIONS

U.S. Office Action issued May 22, 2014 in corresponding U.S. Appl. No. 12/654,627.
U.S. Office Action issued Jun. 16, 2014 in corresponding U.S. Appl. No. 12/805,095.
U.S. Notice of Allowance issued Dec. 17, 2014 in corresponding U.S. Appl. No. 12/654,627.
U.S. Notice of Allowance issued Jan. 5, 2015 in corresponding U.S. Appl. No. 12/805,095.
U.S. Notice of Allowance issued Mar. 30, 2015 in corresponding U.S. Appl. No. 12/654,627.
Chinese Office Action issued Apr. 19, 2013 in corresponding Chinese Patent Application No. 201010001514.0.
European Search Report issued Nov. 18, 2013 in corresponding European Patent Application No. 10150070.0.
U.S. Office Action issued Sep. 12, 2013 in corresponding U.S. Appl. No. 12/654,627.
Advisory Action issued Dec. 27, 2013 in corresponding U.S. Appl. No. 12/654,627.
Chinese Decision on Grant issued Jun. 3, 2015 in corresponding Chinese Patent Application No. 201010001514.0.
U.S. Appl. No. 12/805,095, filed Jul. 12, 2010, Jae Koog An, Samsung Electronics Co., Ltd.
U.S. Appl. No. 12/654,627, filed Dec. 28, 2009, Jae Koog An, Samsung Electronics Co., Ltd.
U.S. Appl. No. 14/694,162, filed Apr. 23, 2015, Jae Koog An, Samsung Electronics Co., Ltd.
Korean Office Action dated Jun. 22, 2015 in corresponding Korean Patent Application No. 10-2009-0072280.

* cited by examiner

WATER FILTER DEVICE AND REFRIGERATOR HAVING THE SAME

CROSS-REFERENCE TO RELATED APPLICATIONS

This application is a continuation of U.S. application Ser. No. 14/694,162 filed Apr. 23, 2015, which is a continuation of U.S. application Ser. No. 12/805,095 filed Jul. 12, 2010, which is a continuation-in-part and claims priority to U.S. application Ser. No. 12/654,627 filed Dec. 28, 2009, which in turn claims the benefit of Korean Patent Application Nos. 10-2009-0001238 and 10-2009-0072280, filed on Jan. 7, 2009 and Aug. 6, 2009 respectively in the Korean Intellectual Property Office, the disclosures of which are incorporated herein by reference.

BACKGROUND

1. Field

Embodiments of the present invention relate to a water filter device for purifying water supplied from an external water supply source, and a refrigerator including a storage tank unit to store water purified by the water filter device.

2. Description of the Related Art

Recently-developed refrigerators have a tendency to accomplish desired purposes of appliances equipped therein by filtering tap water (raw water) using a water filter device, and thus obtaining clear water (purified water).

Such a refrigerator includes a water filter device provided with a water filter to purify water supplied from an external water supply source, and a storage tank to store the water purified by the water filter device.

Even in a state in which a door of the refrigerator is not opened, the water filter device may supply the purified water to a dispenser and an ice maker, in order to dispense water and ice desired by the user.

However, conventional refrigerators having the above-mentioned configuration have a difficulty in assembly operation because the water filter device and storage tank are separate from each other. For this reason, there is an increase in material costs and labor costs in the conventional refrigerators.

SUMMARY

Therefore, it is an aspect of the present invention to provide a refrigerator including a water filter device and a storage tank, which are integrated into a single assembly.

Additional aspects will be set forth in part in the description which follows and, in part, will be apparent from the description, or may be learned by practice of the invention.

In accordance with one aspect, a refrigerator includes a cabinet defined therein with a storage chamber, and a water filter device installed in the storage chamber, to purify water supplied from an external water supply source, wherein the water filter device includes a filter unit to purify the water supplied from the water supply source, a storage tank unit to store the water purified through the filter unit, and a case to receive the filter unit and the storage tank unit.

The filter unit may include a water filter assembly, and a filter head assembly separably coupled to the water filter assembly.

The filter head assembly may include an inlet to allow the water from the water supply source to be introduced into the water filter assembly, and an outlet to allow the water purified through the water filter assembly to be discharged to the storage tank unit.

A supply tube connected to the water supply source may be connected to the inlet. A connecting tube connected to the storage tank unit may be connected to the outlet.

The refrigerator may further include an ice maker installed in the storage chamber, to make ice, and a dispenser to supply the water purified through the water filter device to an outside of the refrigerator.

A discharge tube may be connected to the storage tank unit, to discharge the water from the storage tank unit to the ice maker and the dispenser.

The case may be formed with a through hole to guide the supply tube and the discharge tube.

In accordance with another aspect, a water filter device includes a filter unit to receive water from an external water supply source and to purify the received water, a storage tank unit to store the water purified through the filter unit, and a case to receive the filter unit and the storage tank unit.

The filter unit may include a water filter assembly, and a filter head assembly separably coupled to the water filter assembly.

A connecting tube may be connected between the filter head assembly and the storage tank unit, to introduce the water purified through the water filter unit to the storage tank unit.

The filter head assembly may include a first inlet and a first inlet passage, to guide the water from the water supply source to be introduced into the water filter assembly, and a first outlet and a first outlet passage, to guide the water purified through the water filter assembly to be discharged to the storage tank unit.

A supply tube connected to the water supply source may be connected to the first inlet. A second inlet passage formed at the storage tank unit may be connected to the first outlet.

The storage tank unit may include a storage tank, and an inlet pipe inserted into the storage tank, to guide the water purified through the filter unit to be stored in the storage tank.

The storage tank unit may include a storage tank, and an inlet pipe inserted into the storage tank, to guide the water purified through the filter unit to be stored in the storage tank.

The storage tank may include a second inlet passage connected to the first outlet of the filter head assembly and the inlet pipe at opposite ends of the second inlet passage, respectively, and a second outlet to discharge the water stored in the storage tank.

The refrigerator may further include an ice maker installed in the storage chamber, to make ice, and a dispenser to supply the water purified through the water filter device to an outside of the water filter device. A discharge tube may be connected to the second outlet of the storage tank, to discharge the water from the storage tank to the ice maker and the dispenser.

The storage tank may be divided into an insertion space, into which the inlet pipe is inserted, and a storage space, in which water introduced through the inlet pipe is stored. The storage space may communicate with the insertion space at a side opposite to the second outlet.

The storage tank has an inner surface rounded at one side thereof to disperse a pressure of the water introduced into the storage space through the inlet pipe.

The filter assembly may include a first body, and a second body received in the first body such that the second body is movable within the first body by a pressure of water introduced through the inlet passage or when the water filter assembly is coupled or separated. An elastic member may be arranged between the first body and the second body, to move the second body within the first body when the pressure of the water introduced through the inlet passage is low.

In accordance with another aspect, a refrigerator includes a cabinet defined therein with a storage chamber, and a water filter device installed in the storage chamber, to purify water supplied from an external water supply source, wherein the water filter device includes a filter unit to purify the water supplied from the water supply source, a storage tank unit to store the water purified through the filter unit, and a case to receive the filter unit and the storage tank unit, wherein the storage tank unit includes a storage tank, and an inlet pipe inserted into the storage tank, to guide the water purified through the filter unit to be stored in the storage tank.

In accordance with another aspect, a water filter device includes a filter unit to receive water from an external water supply source and to purify the received water, a storage tank unit to store the water purified through the filter unit, and a case to receive the filter unit and the storage tank unit, wherein the storage tank unit includes a storage tank, and an inlet pipe inserted into the storage tank, to guide the water purified through the filter unit to be stored in the storage tank.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
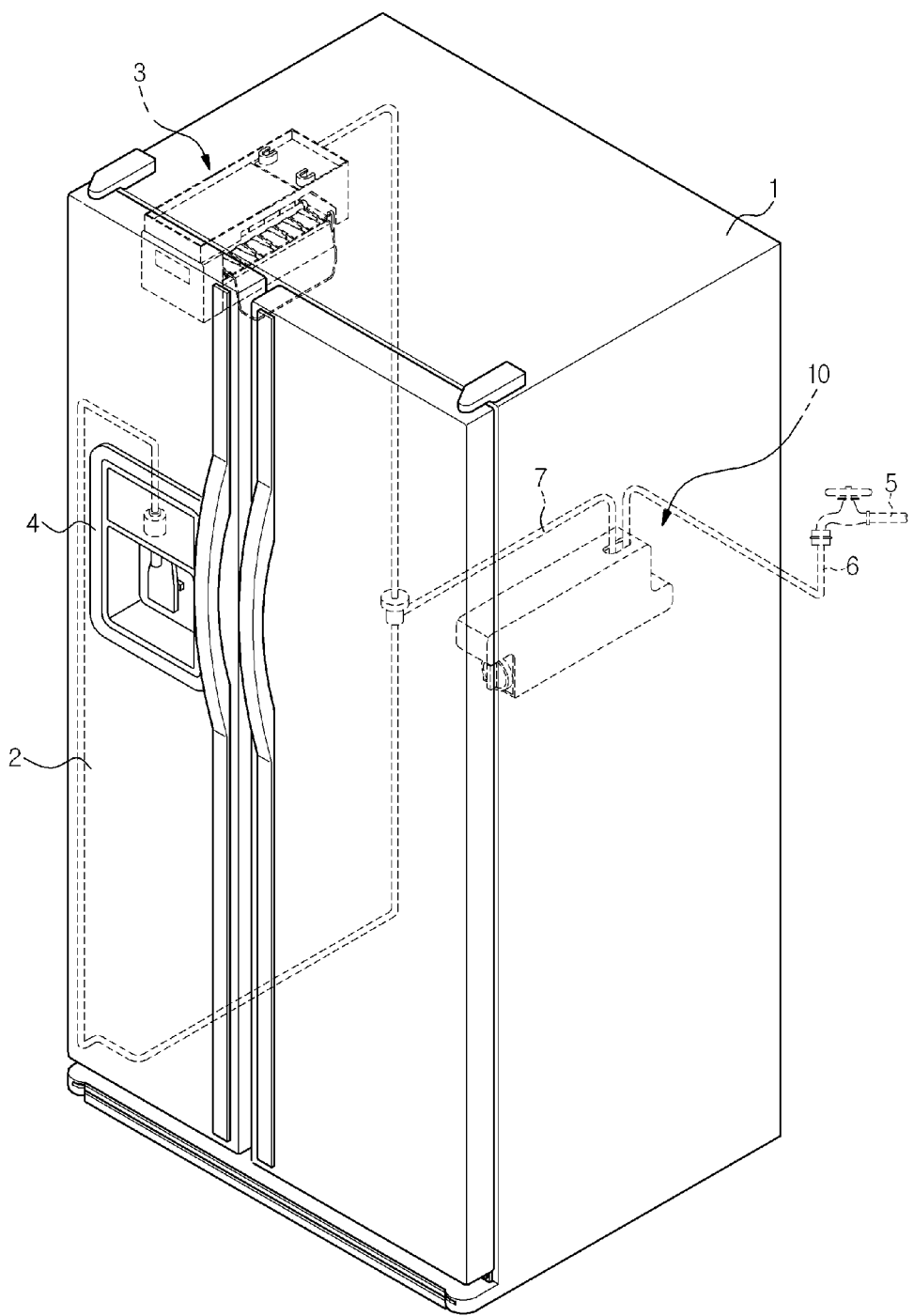
FIG. 1 is a perspective view illustrating a refrigerator according an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

As shown in FIG. 1, the refrigerator includes a cabinet 1 to define an outer appearance of the refrigerator. A storage chamber (not shown), in which food may be stored, is defined in the interior of the cabinet 1. The storage chamber is partitioned into a refrigerating compartment and a freezing compartment by a barrier wall (not shown).

Respective heat exchangers (not shown) and respective blowing fans (not shown) are installed at the rear of the refrigerating and freezing compartments, to independently generate cold air and to independently supply the cold air to the refrigerating and freezing compartments. A machinery chamber (not shown) is defined at a rear and lower portion of the cabinet 1, to install a compressor (not shown) and a condenser (not shown) therein. Using the compressor and condenser, a refrigerant is compressed and then condensed. The condensed refrigerant is sent to the heat exchangers.

Doors 2 are installed at front sides of the compartments of the storage chamber, respectively, to selectively open or close the compartments. A dispenser 4 is provided at a selected one of the doors 2, for example, the door 2 of the freezing compartment, to provide water and ice desired by the user even in a closed state of the door 2.

Also installed in the storage chamber are an ice maker 3 to receive water and to make ice from the received water, and a water filter device 10 to purify water, to store the purified water, and to supply the stored water to the dispenser 4 and ice maker 3. To this end, the refrigerator is also provided with a supply tube 6 to supply water from an external water supply source 5 to the water filter device 10, and a discharge tube 7 to supply water purified by the water filter device 10 to the ice maker 3 and dispenser 4.

Figure 2:
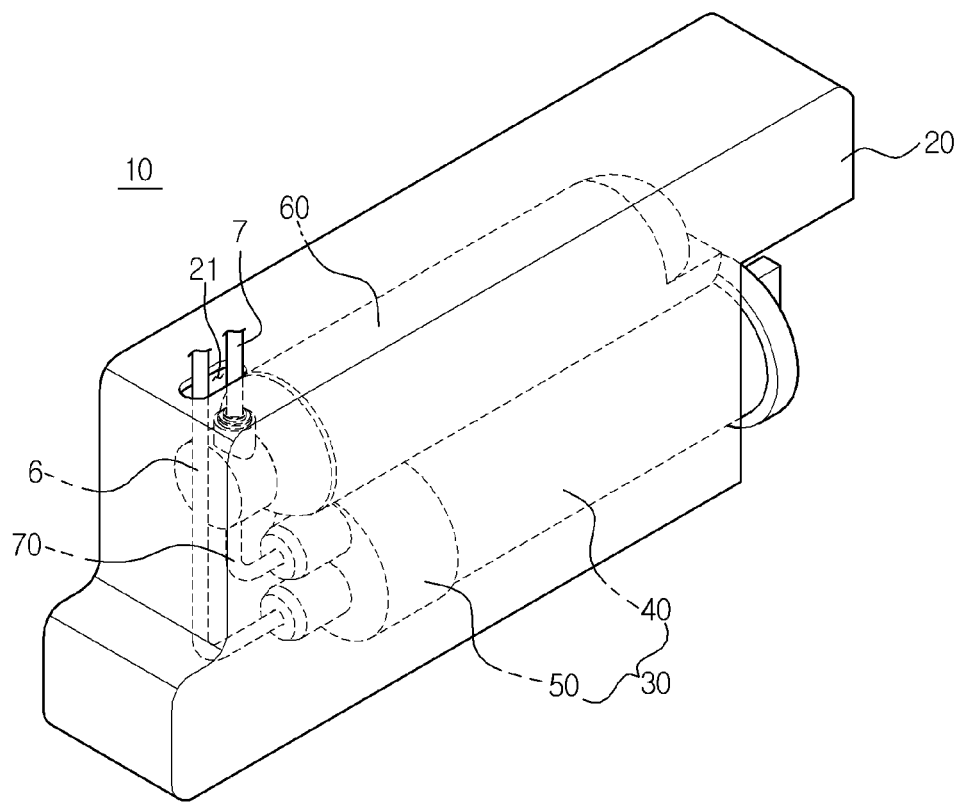
FIG. 2 is a perspective view illustrating a water filter device according to an exemplary embodiment.
Figure 3:
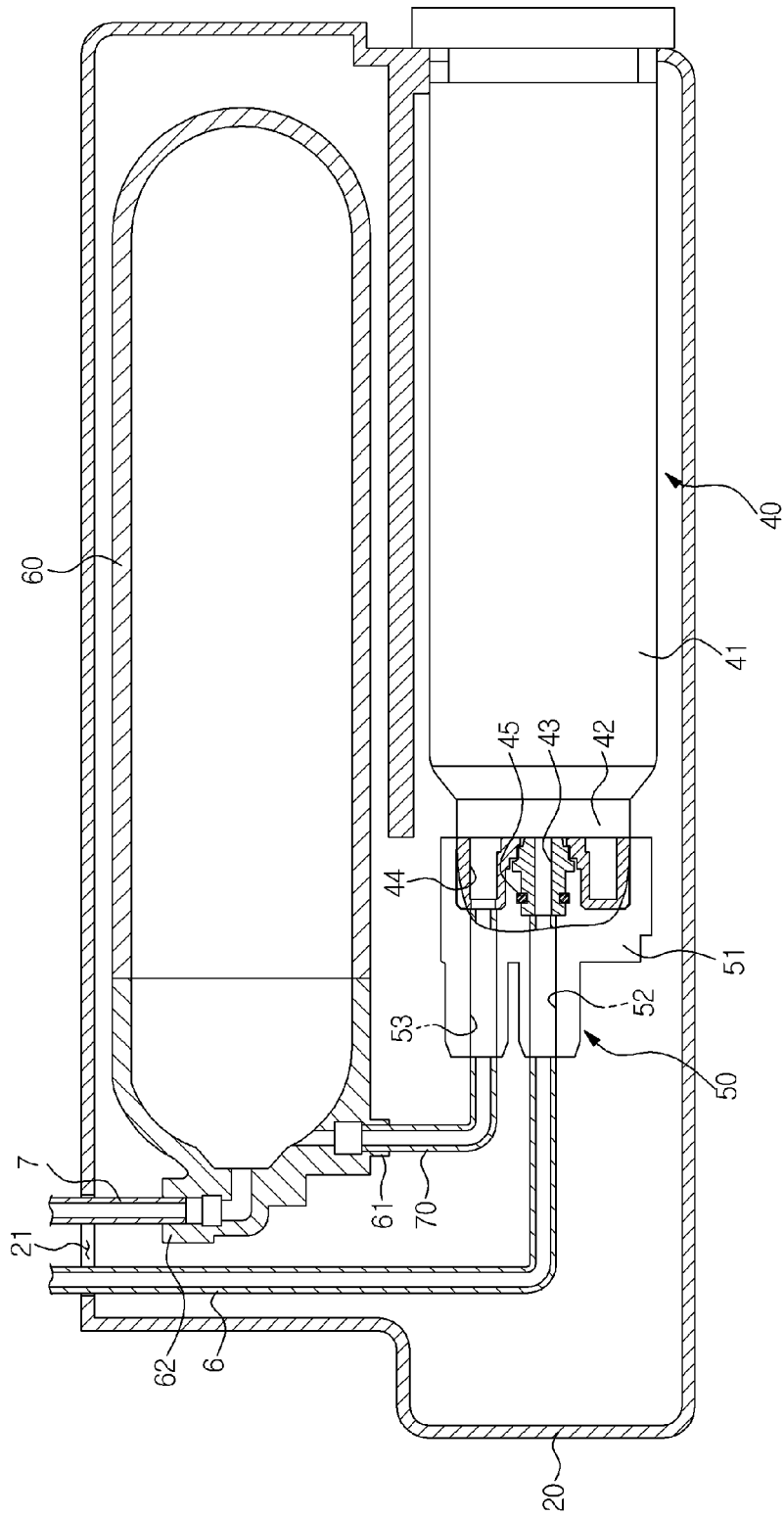
FIG. 3 is a sectional view illustrating the water filter device shown in FIG. 2.

As shown in FIGS. 2 and 3, the water filter device 10 includes a case 20 installed in the storage chamber. The case 20 is defined with a space to receive a filter unit 30 to purify water supplied from the external water supply source 5 via the supply tube 6, and a water storage tank unit 60 to store the water purified by the filter unit 30.

The case 20 is formed with a through hole 21 to guide the supply tube 6 and discharge tube 7 to an inlet 52 of a filter head assembly 50, which will be described later, and an outlet 62 of the storage tank unit 60, respectively.

The filter unit 30 includes a water filter assembly 40 separably received in the case 20. The filter head assembly 50 is also included in the filter unit 30. The filter head assembly 50 is separably coupled to the water filter assembly 40.

The water filter assembly 40 includes a filter case 41 to receive a filter (not shown), and a coupler 42 provided at one side of the filter case 41. The filter head assembly 50 is coupled to the coupler 42.

A filter inlet 43 is formed through the coupler 42, to allow the filter head assembly 50 to receive external water therethrough. A filter outlet 44 is also formed through the coupler 42, to allow the filter head assembly 50 to discharge water purified after being introduced into the water filter assembly 40 through the filter inlet 43.

A sealing member 45 may be fitted around an outer peripheral surface of the coupler 42, to prevent water discharged through the filter outlet 44 from leaking to the outside.

The filter head assembly 50 includes a body 51 having an inlet 52, through which water from the external water supply source 5 is introduced, and an outlet 53, through which the water introduced through the inlet 52 is discharged in a purified state. Although not shown, the body 51 may be provided with a core (not shown) installed in the body 51 such that the core is extendable or retractable, and an elastic member (not shown) to elastically support the core.

The inlet 52 is connected with the supply tube 6, to receive water from the water supply source 5. A connecting tube 70 is also connected between the filter head assembly 50 and the storage tank unit 60, to discharge water purified by the water filter assembly 40 to the storage tank unit 60. The outlet 53 of the filter head assembly 50 is connected to the connecting tube 70.

As described above, the storage tank unit 60 is received in the case 20. The storage tank unit 60 includes a storage tank inlet 61 connected to the connecting tube 70, and a storage tank outlet 62 connected to the discharge tube 7, which supplies water introduced through the storage tank inlet 61 to the ice maker 3 and dispenser 4.

Figure 4:
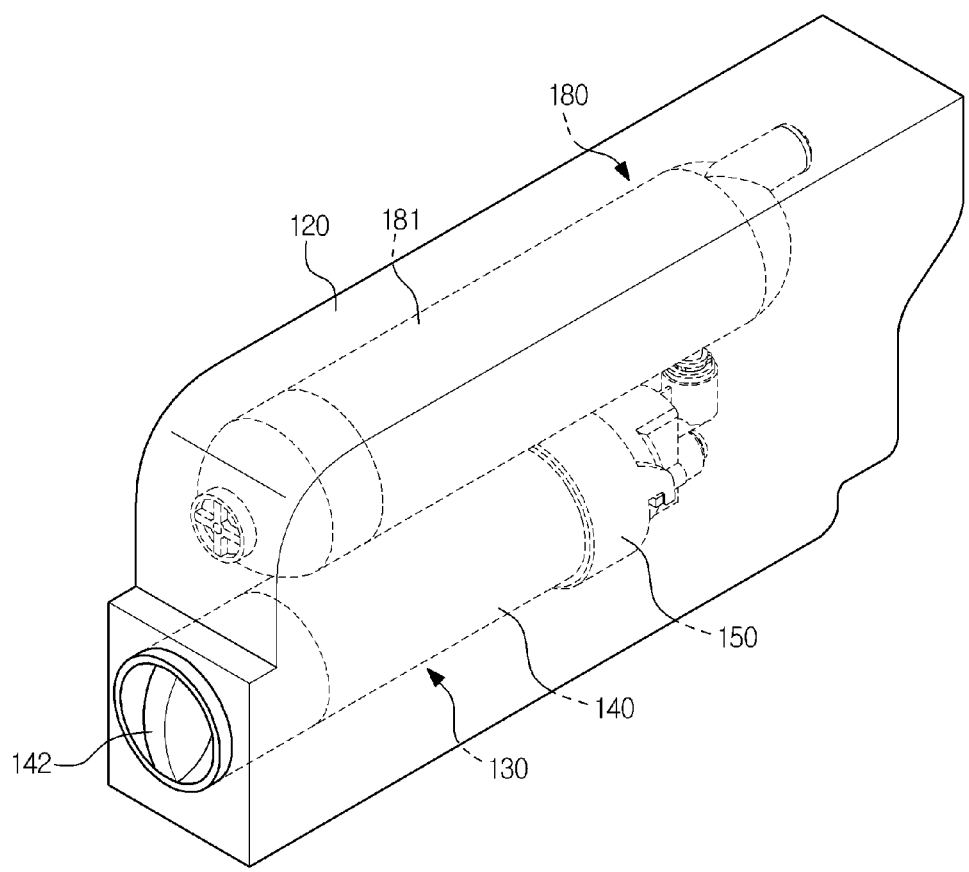
FIG. 4 is a perspective view illustrating a water filter device according to another exemplary embodiment.
Figure 5:
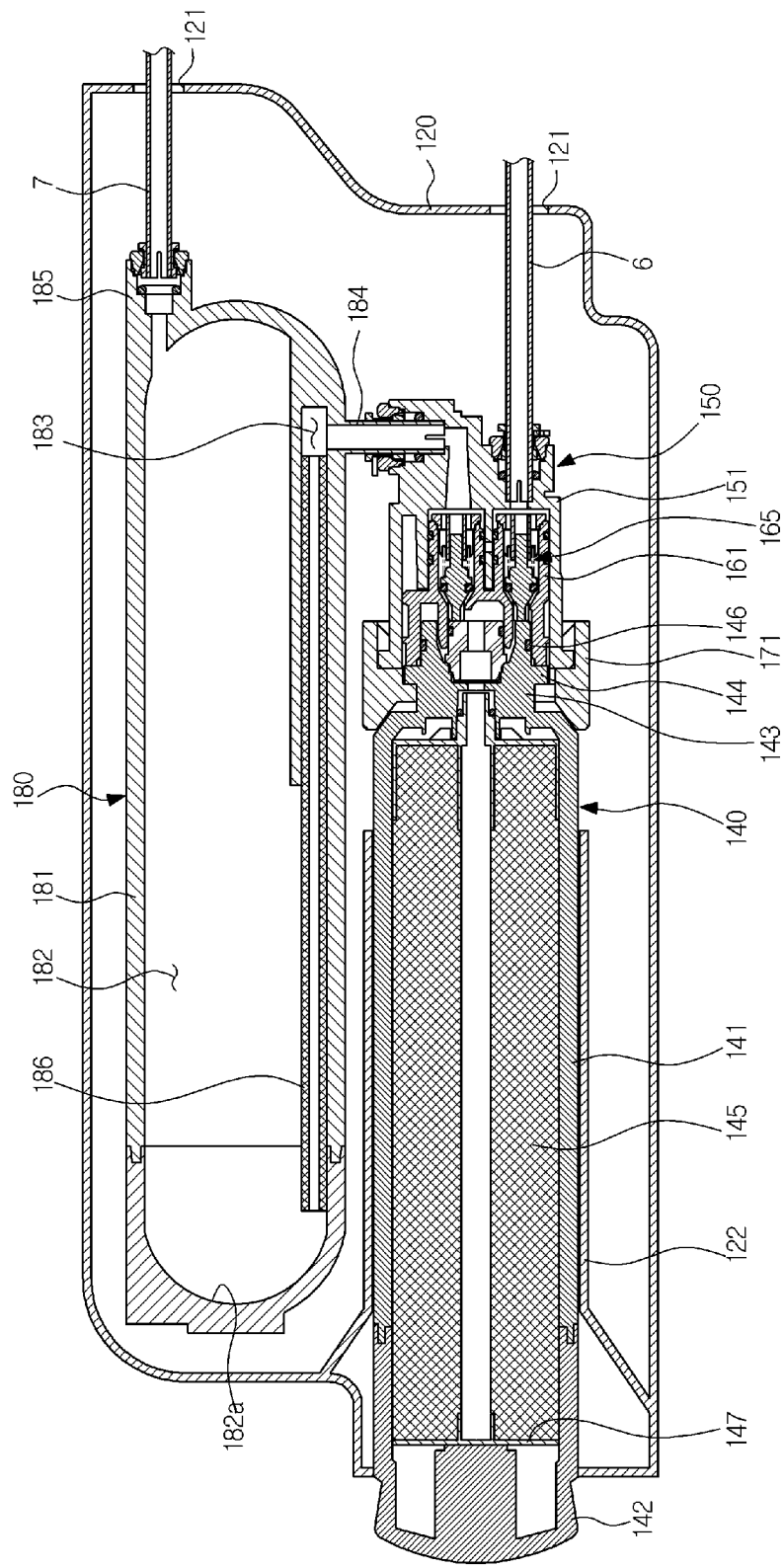
FIG. 5 is a sectional view illustrating the water filter device shown in FIG. 4.

Meanwhile, FIGS. 4 to 8 are views illustrating a water filter device according to another exemplary embodiment. As shown in FIGS. 4 and 5, the water filter device 10 includes a case 120 installed in the storage chamber, as in the previous embodiment. Although not shown, the water filter device 10 may be received in a recess formed at one side surface of a storage container 19 arranged adjacent to one side wall of the refrigerating compartment.

That is, the water filter device 10 may be arranged at a position adjacent to the storage container 19 arranged at a lower portion of the refrigerating compartment 11, in order to efficiently use the internal space of the refrigerating compartment 11.

Figure 12:
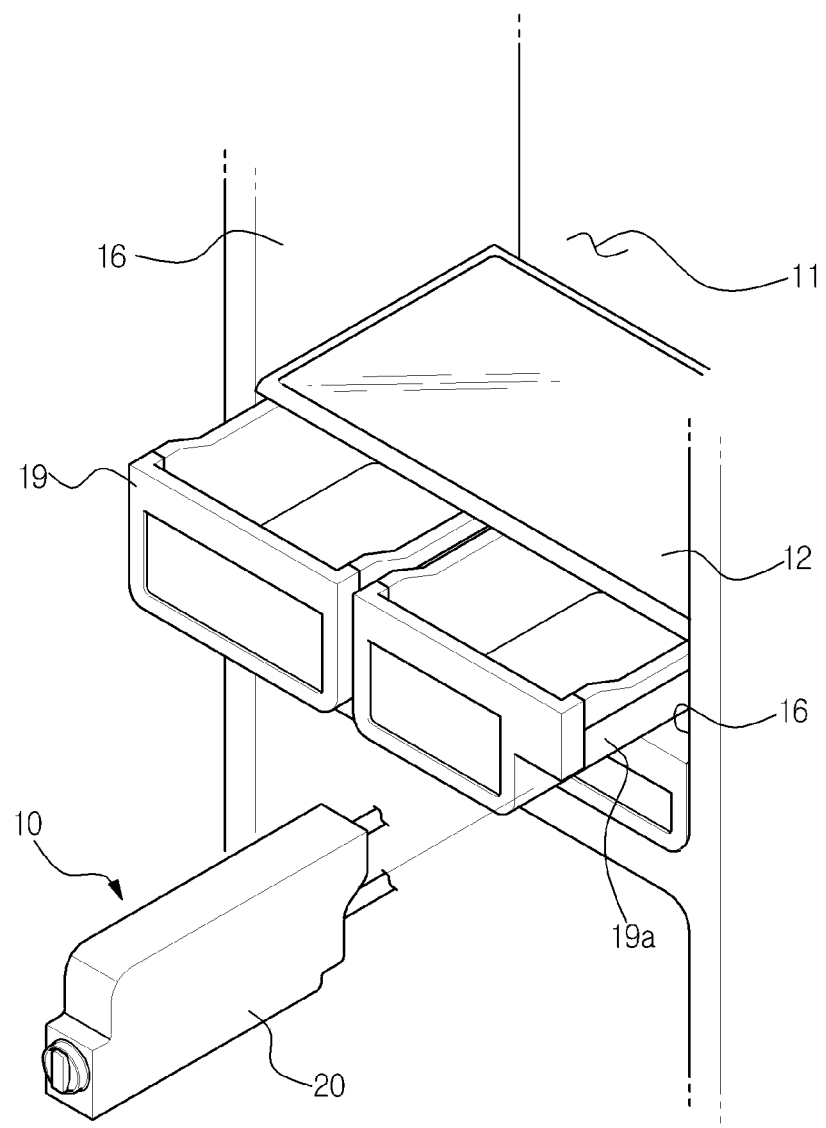
FIGS. 12 and 13 are perspective views illustrating a water filter device in a refrigerator according to another embodiment of the present invention.
Figure 13:
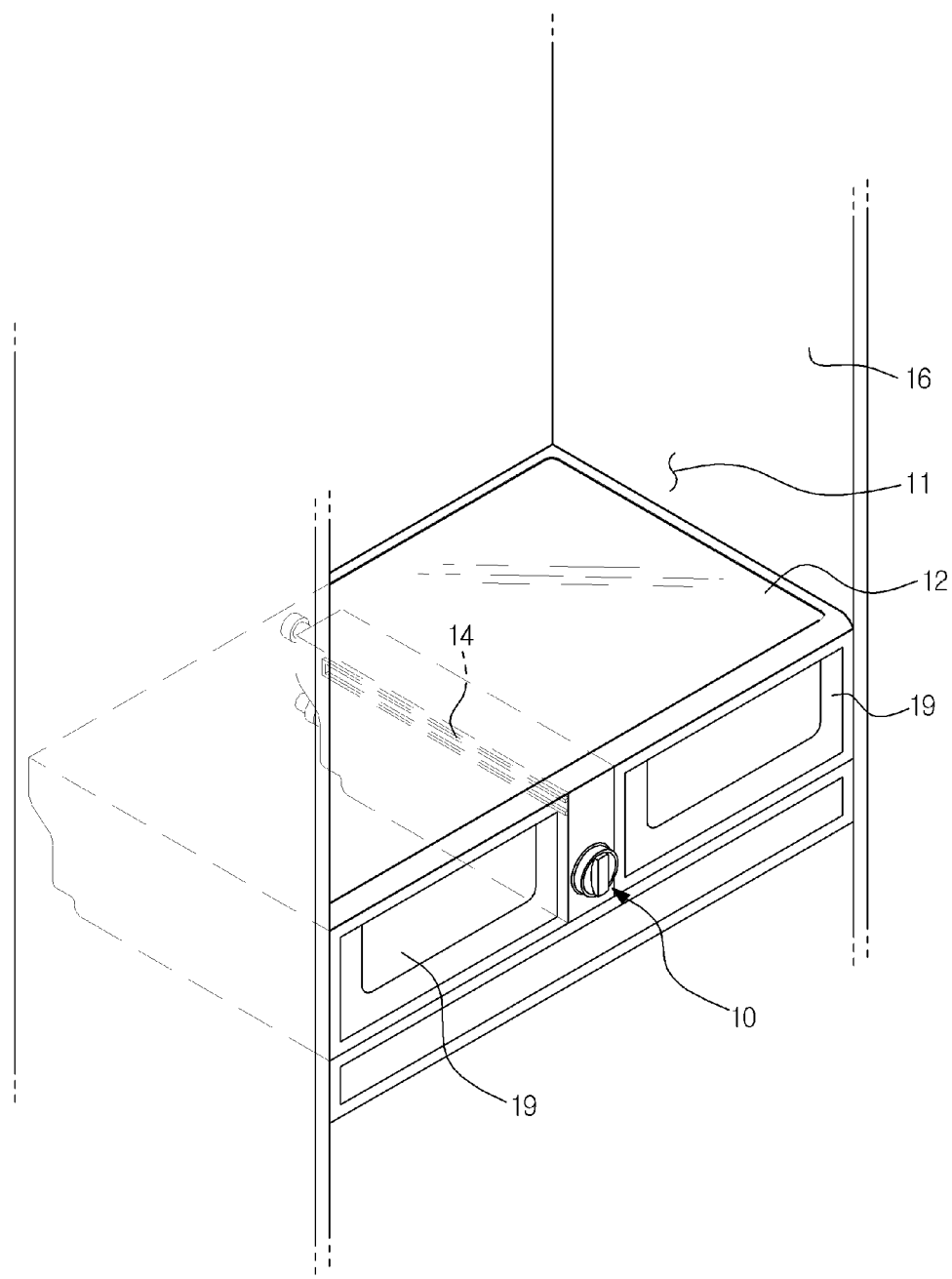

FIGS. 12 and 13 illustrate an embodiment in which the water filter device is arranged at a position adjacent to the storage container.

Referring to FIG. 12, the water filter device 10 according to this embodiment may be arranged between the storage container 10 arranged at a lower portion of the refrigerating compartment 11 and one inner side wall 16 of the refrigerating compartment 11.

The storage container 19 is arranged beneath a storage container cover 12 arranged at the lower portion of the refrigerating compartment 11. The storage container cover 12 partitions the internal space of the refrigerating compartment 11, to define an upper space to store food and a lower space to receive the storage container 19. The storage container cover 12 is supported by the opposite inner side walls 16 of the refrigerating compartment 11, and covers the upper surface of the storage container 19.

At least a portion of the storage container cover 12 may be made of a transparent material, in order to allow the user to identify food contained in the storage container 19.

A recess 19a may be formed at one side surface of the storage container 19 arranged adjacent to one side wall 16 of the refrigerating compartment 11, to receive the water filter device 10.

The recess 19a has a shape corresponding to an outer appearance of the water filter device 10. Accordingly, where the water filter device 10 is arranged between the storage container 19 and one side wall 16 of the refrigerating compartment 11, the water filter device 10 is tightly fitted in the recess 10a.

In accordance with the above-described configuration, there is no reduction in the storage space of the refrigerating compartment 11, which may be caused by separate installation of the filter unit 20 and storage tank unit 80 in conventional cases. That is, the water filter device 10 is arranged in a useless space, which may be formed between the storage container 19 and one side wall 16 of the refrigerating compartment 11 in conventional cases. The case 20 of the water filter device 10 is also surrounded by the storage container 10. Accordingly, the space utility of the refrigerating compartment 11 is enhanced. Also, the appearance becomes more beautiful.

Although the recess 19a to receive the water filter device 10 is provided at the storage container 19 in this embodiment, it may be formed at one side wall 16 of the refrigerating compartment 11 or may be formed at both one side wall 16 of the refrigerating compartment 11 and the storage container 19.

Where the water filter device 10, which includes the storage tank unit 80, is arranged between the storage container 10 and one side wall 16 of the refrigerating compartment 11, it is unnecessary to use a separate heater to prevent water stored in a water tank from being frozen. This is because the phenomenon, in which water stored in the water tank is frozen by cold air, is reduced in this case, as compared to the case in which the water tank is arranged at a rear wall of the refrigerating compartment 11.

Although the water filter device 10 of the refrigerator according to this embodiment is arranged between the storage container 19 and one side wall 16 of the refrigerating compartment 11, the present general inventive concept is not limited thereto. Where storage containers 19 are arranged in parallel at left and light sides, respectively, as shown in FIG. 13, the water filter device 10 may function as a partition wall.

That is, the water filter device 10 is arranged at a central portion of the receiving space defined beneath the storage container cover 12 to receive the storage container 19. In this case, the water filter device 10 laterally divides the receiving space into space portions, to allow the storage containers 19 to be separably received in respective space portions.

In this case, the space utility is further enhanced because the useless space of a partition wall to partition the storage containers 19 is occupied by the water filter device 10.

In this case, guide rail 14 may be provided at opposite side surfaces of the water filter device 10 arranged between the storage containers 19, to guide movements of the storage containers 19.

The case 120 is defined with a space to receive a filter unit 130 to purify water supplied from the external water supply source 5 via the supply tube 6, and a water storage tank unit 180 to store the water purified by the filter unit 130.

The case 120 is formed with through holes 121 to guide the supply tube 6 and discharge tube 7 to a first inlet 152 of a filter head assembly 150, which will be described later, and a second outlet 185 of the storage tank unit 180, respectively.

The filter unit 130 includes a water filter assembly 140 separably received in the case 120. The filter head assembly 150 is also included in the filter unit 130. The filter head assembly 150 is separably coupled to the water filter assembly 140.

As in the previous embodiment, the water filter assembly 140 includes a filter case 141, and a filter 145 received in the filter case 141.

The filter case 141 has a cylindrical structure open at one end thereof. A handle 142 is coupled to one end of the filter case 141, namely, the open end, such that the handle 142 closes the open end of the filter case 141.

A coupler 143 is provided at the other end of the filter case 141. The coupler 143 is fitted in the filter head assembly 150. At an outer peripheral surface of the coupler 143, coupling protrusions 144 are provided to couple the coupler 143 with the filter head assembly 150. A first sealing member 146 is also provided at the outer peripheral surface of the coupler 143, to prevent water introduced into or discharged from the filter case 141 from leaking to the outside.

The filter 145 is received in the filter case 141 through the open end of the filter case 141 in a state in which opposite ends of the filter 145 are supported by caps 147, respectively.

Figure 6:
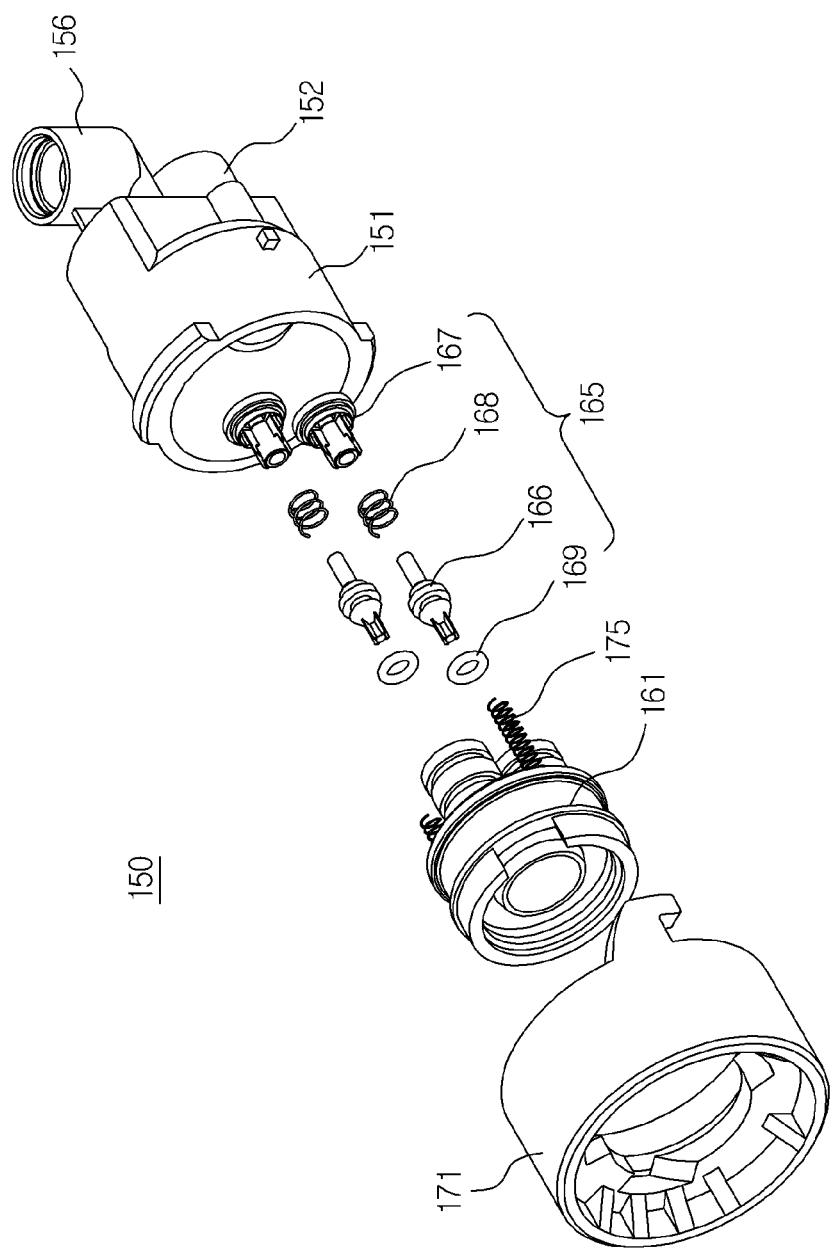
FIG. 6 is an exploded perspective view illustrating the water filter device of FIG. 5.
Figure 7:
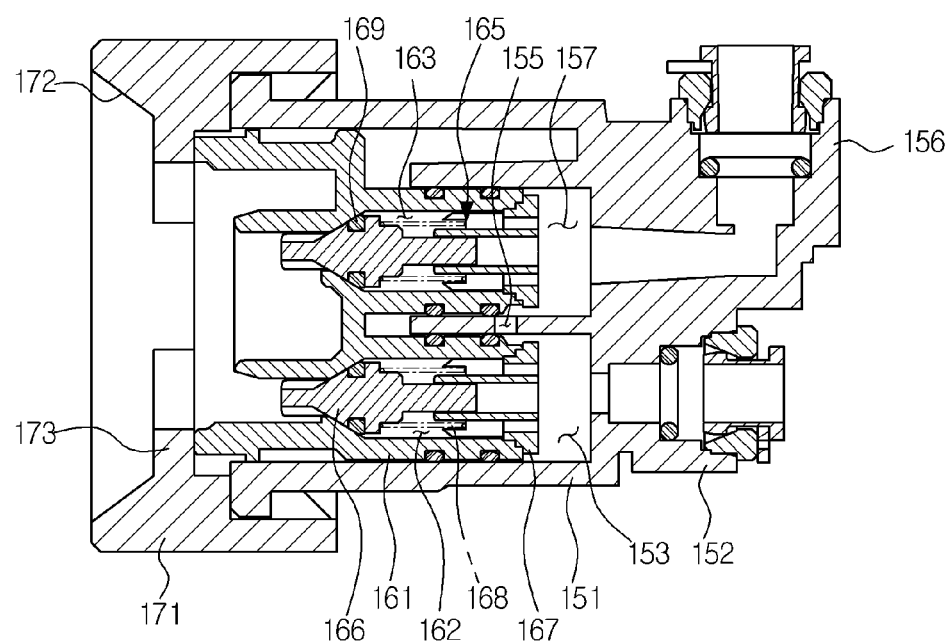
FIG. 7 is an enlarged sectional view illustrating a filter head assembly included in the water filter device of FIG. 5.

As shown in FIGS. 6 and 7, the filter head assembly 150 includes a first body 151, a second body 161 received in the first body 151 such that the second body 161 is extendable or retractable within the first body 151, and a bracket 171 to support one-side ends of the first and second bodies 151 and 161.

The first body 151 is provided with a first inlet 152 and a first inlet passage 153, through which water from the water supply source 5 is introduced. The first body 151 is also provided with a first outlet 156 and a first outlet passage 157, through which water purified by the water filter assembly 140 is discharged to the storage tank unit 180. A bypass passage 155, which communicates the first inlet passage 153 and first outlet passage 157, is also provided at the first body 151.

As described above, the second body 161 is received in the first body 151 such that the second body 161 is extendable or retractable within the first body 151. The second body 161 is formed with a first communicating passage 162 to communicate the first inlet passage 153 and water filter assembly 140, and a second communicating passage 163 to communicate the first outlet passage 157 and water filter assembly 140.

Valve units 165 are provided at each of the communicating passages 162 and 163. The valve units 165 function to open or close the first inlet passage 153 and first communicating passage 162, and the first outlet passage 157 and second communicating passage 163, respectively.

Each valve unit 165 includes a valve stem 166, a support member 167 to support the valve stem 166, a first elastic member 168 to elastically support the valve stem 166 between the valve stem 166 and the support member 167, and a second sealing member 169 arranged around an outer peripheral surface of the valve stem 166. The first elastic member 168 elastically supports the valve stem 166 when the water filter assembly 140 is mounted to or separated from the filter head assembly 150.

As described above, the bracket 171 supports one-side ends of the first and second bodies 151 and 161. A socket portion 172 is provided at each of the bracket 171 and second body 161. The coupler 143 of the water filter assembly 140 is fitted in the socket portion 172. Engagement protrusions 173 are provided at an inner peripheral surface of the socket portion 172. When the coupler 143 is rotated 90° after being fitted into the socket portion 172, the coupling protrusions 144 of the coupler 143 are engaged with the engagement protrusions 173, so that the coupler 143 is coupled to the socket portion 172.

In accordance with the above-described configuration, the water filter assembly 140 is mounted to the filter head assembly 150 when the handle 142 is rotated 90° under the condition in which the water filter assembly 140 is fitted in a filter receiving portion 122 of the case 120, such that the coupling protrusions 144 of the water filter assembly 140 are engaged with the engagement protrusions 173 of the filter head assembly 150. When it is desired to replace the water filter assembly 140 with a new one, the water filter assembly 140 may be separated from the case 120 as the handle 142 is rotated in an opposite direction, and then pulled.

Although the water filter assembly 140 is separably coupled to the filter head assembly 150, and the coupling is achieved by the coupling protrusions 144 and engagement protrusions 173 in this embodiment, this configuration is only an illustrative example. The coupling may be achieved using other known configurations such as a thread coupling structure, a latch structure, or a hook structure.

Figure 8:
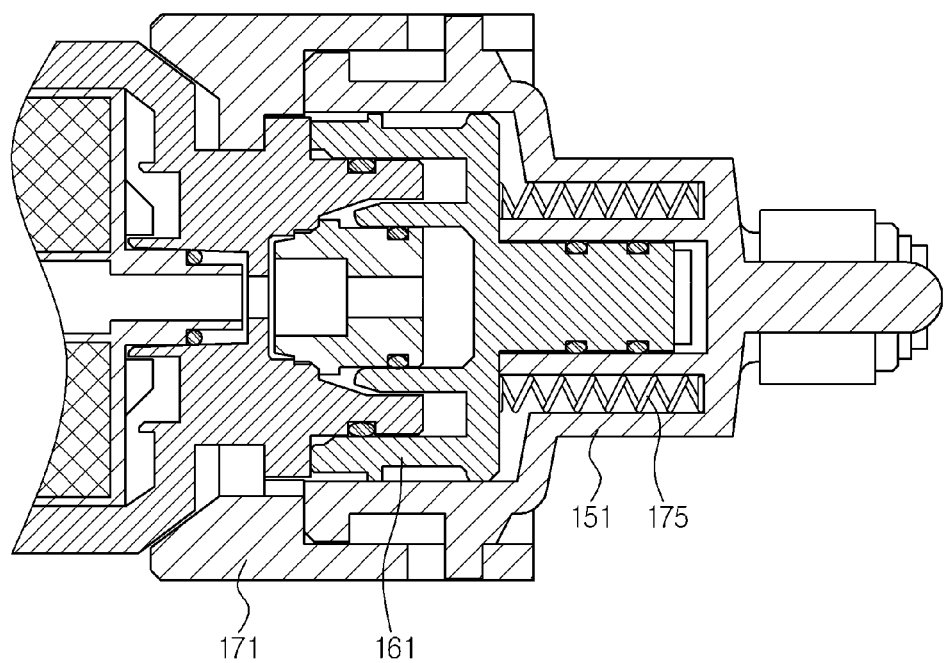
FIG. 8 is an enlarged sectional view illustrating the water filter device of FIG. 5 in a 90°-rotated state.

In accordance with this embodiment, a second elastic member 175 is arranged between the first body 151 and the second body 161, as shown in FIGS. 5 and 8. When the pressure of water supplied to the water filter device 10 is low, the valve unit 165 may not operate due to the low water pressure. In this case, the second elastic member 175 functions to prevent such non-operation of the valve unit 165 caused by the low water pressure.

Again referring to FIG. 5, the storage tank unit 180 includes a storage tank 181 to store water purified by the filter unit 130, and an inlet pipe 186 inserted into the storage tank 181.

The storage tank 181 includes a second inlet passage 184 connected to the first outlet 156 formed at the first body 151 of the filter head assembly 150, and a second outlet 185, to which the discharge tube 7 to supply purified water to the ice maker 3 and dispenser 4 is connected. The second inlet passage 184 is provided in the form of a pipe at a bottom side of the storage tank 181 in the rear of the storage tank 181. Accordingly, the second inlet passage 184 is connected to the first outlet 156 in a fitting manner. The second outlet 185 is provided at the rear side of the storage tank 181.

The first outlet 156 of the filter head assembly 150 is arranged such that it is directly connected to the second inlet passage 184 of the storage tank unit 180, in order to reduce the length of the water supply line in this embodiment of the invention. Of course, the first outlet 156 may be indirectly connected to the second inlet passage 184 via a water supply valve. In this case, purified water discharged from the first outlet 156 of the filter head assembly 150 is introduced into the water supply valve, and then supplied to the storage tank unit 180 after the water supply valve controls supply amount thereof.

The storage tank 181 is divided into a storage space 182, in which water purified by the filter unit 130 is stored, and an insertion space 183, into which the inlet pipe 186 is inserted. The insertion space 183 communicates, at one end thereof, with the inlet passage 184, while communicating, at the other end thereof, with the storage space 182. That is, water discharged from the filter unit 130 is introduced into the second inlet passage 184, and is then directed to a front portion of the storage space 182 opposite to the second outlet 185 via the inlet pipe 186.

In this embodiment, accordingly, water supplied to the storage tank 181 via the inlet pipe 186 is stored in the storage tank 181, starting from a front side 182a of the storage space 182. As a result, through the outlet 85 opposite to the front side 182a of the storage space 182, water already stored in the storage tank 181 in the vicinity of the outlet 85 and cooled by cold air supplied to the storage chamber is discharged such that it is supplied to the ice maker 3 and dispenser 4.

The front side 182a of the storage space 182 has a round shape in order to disperse the pressure of water introduced into the storage space 182 via the inlet pipe 186, and thus to prevent the storage tank 181 from being damaged due to the water pressure.

Figure 9:
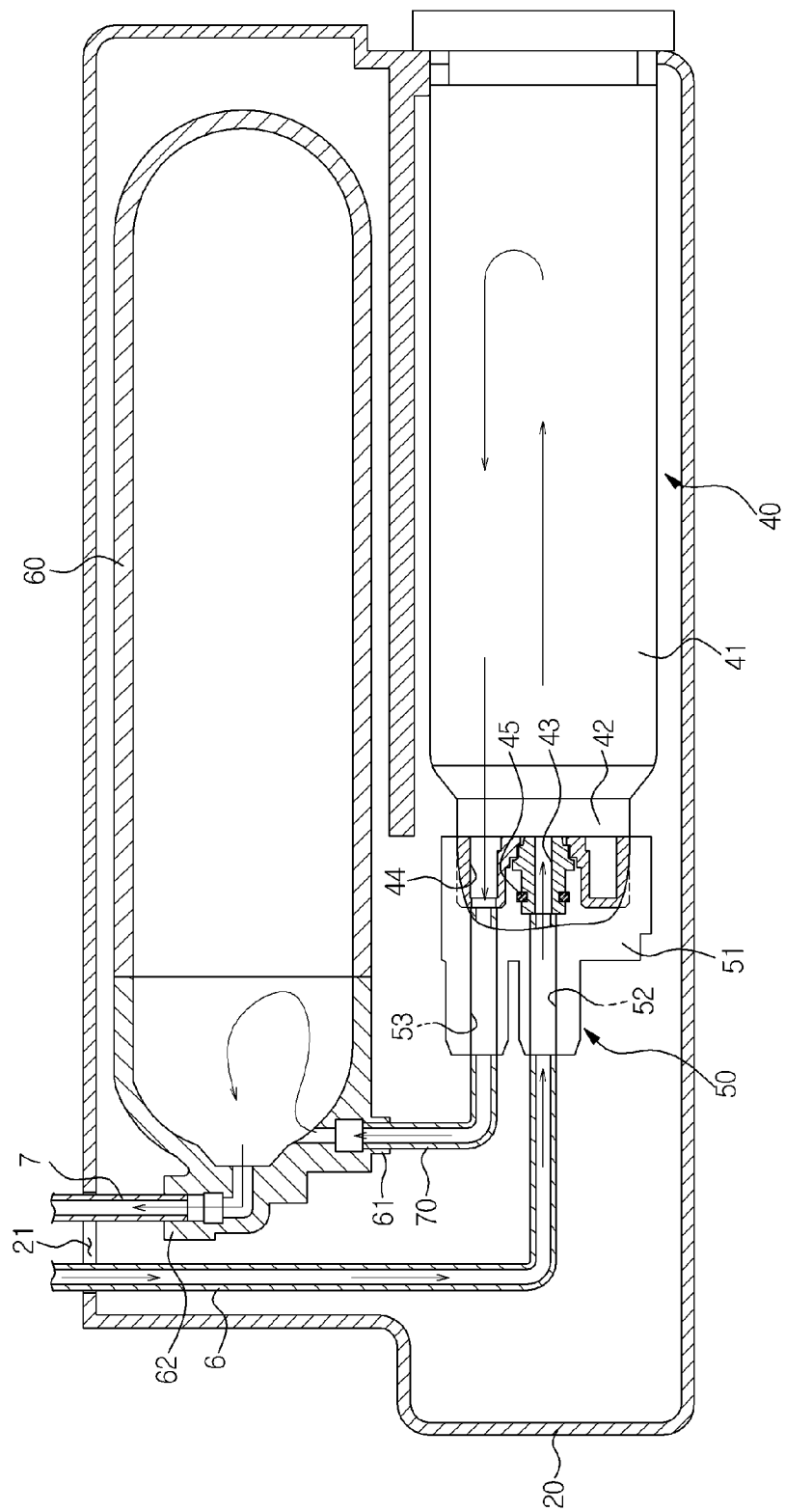
FIGS. 9 to 11 are sectional views to explain flows of water in the water filter devices respectively shown in FIGS. 3 and 5.

Hereinafter, a procedure of supplying water from the external water supply source to the ice maker and dispenser in accordance with the embodiment illustrated in FIG. 3 will be described, with reference to FIG. 9.

Water supplied from the external water supply source 5 is first introduced into the filter unit 30 via the supply tube 6. In this case, the water supplied from the external water supply source 5 may be introduced into the water filter assembly 40 because the water supply tube 6 is in a state of being connected to the inlet 52 of the filter head assembly 50.

The water introduced into the water filter assembly 40 is purified by the water filter assembly 40 and then discharged through the outlet 53 of the filter head assembly 50. The water discharged through the outlet 53 is introduced into the storage tank unit 60 via the connecting tube 70.

The water introduced into the storage tank unit 60 is stored in the storage tank unit 60, and then flows through the discharge tube 7. The water flowing through the discharge tube 7 is fed to the ice maker 3 and dispenser 4.

Figure 10:
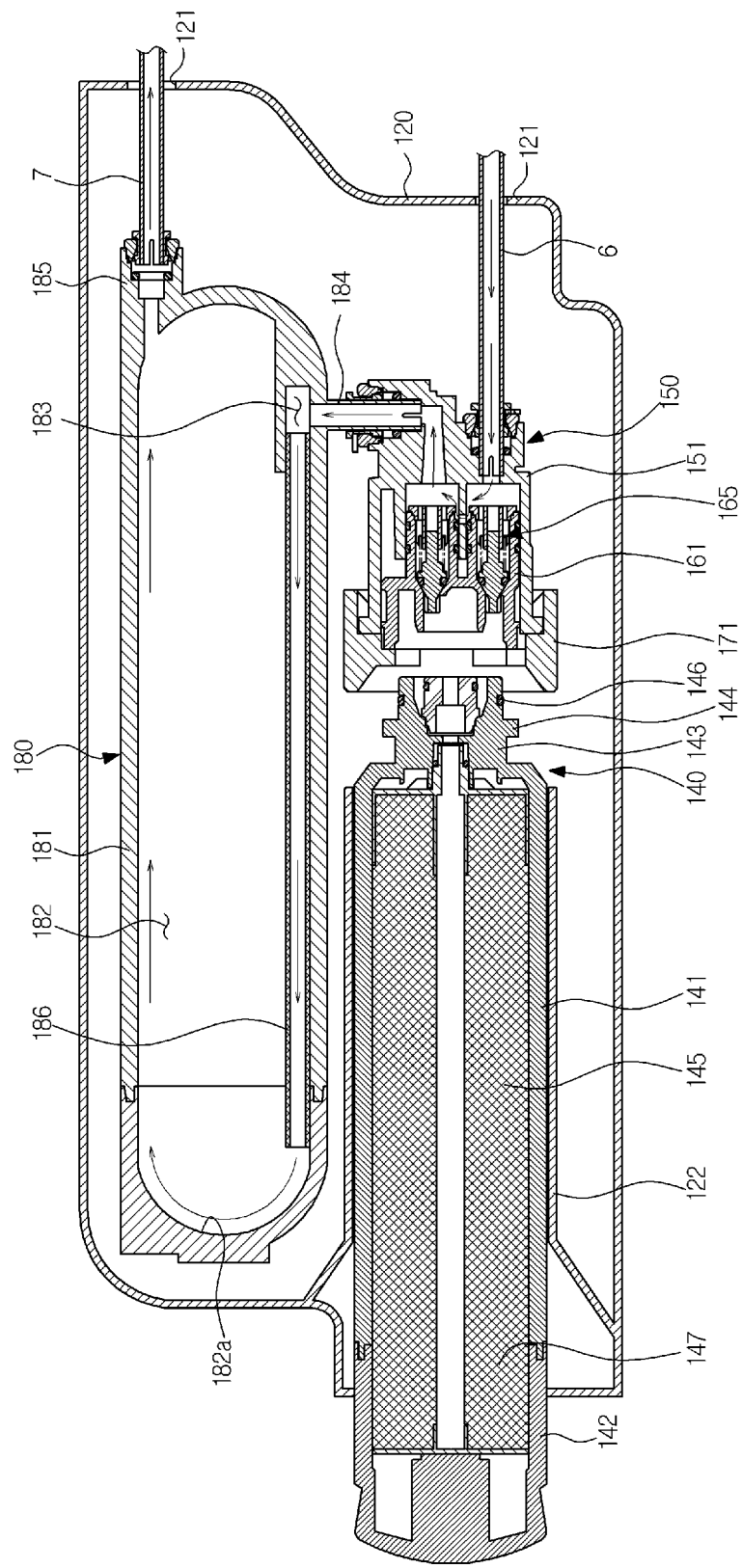

Now, a procedure of supplying water from the external water supply source to the ice maker and dispenser in a state in which the water filter assembly is separated from the filter head assembly, in accordance with the embodiment illustrated in FIG. 5, will be described, with reference to FIG. 10.

Water supplied from the external water supply source 5 is first introduced into the first inlet passage 153 of the filter head assembly via the supply tube 6, and then discharged through the first outlet passage 157 after passing through the bypass passage 155.

In this case, as the water from the external water supply source 5 is introduced into the first inlet passage 153, the second body 161 is moved in a left direction due to the pressure of the introduced water. As a result, the bypass passage 155 is exposed or opened, thereby communicating the first inlet passage 153 and first outlet passage 157. Accordingly, the water flows from the first inlet passage 153 to the first outlet passage 157. During this procedure, the valve stem 166 of the valve unit 165 is always urged toward the water filter assembly 140, thereby closing the first and second communicating passages 162 and 163.

The water discharged from the outlet passage 157 of the filter head assembly 150 is introduced into the storage tank 181. The water introduced into the storage tank unit 181 is stored in the storage tank unit 181, and then flows through the discharge tube 7. The water flowing through the discharge tube 7 is fed to the ice maker 3 and dispenser 4.

Figure 11:
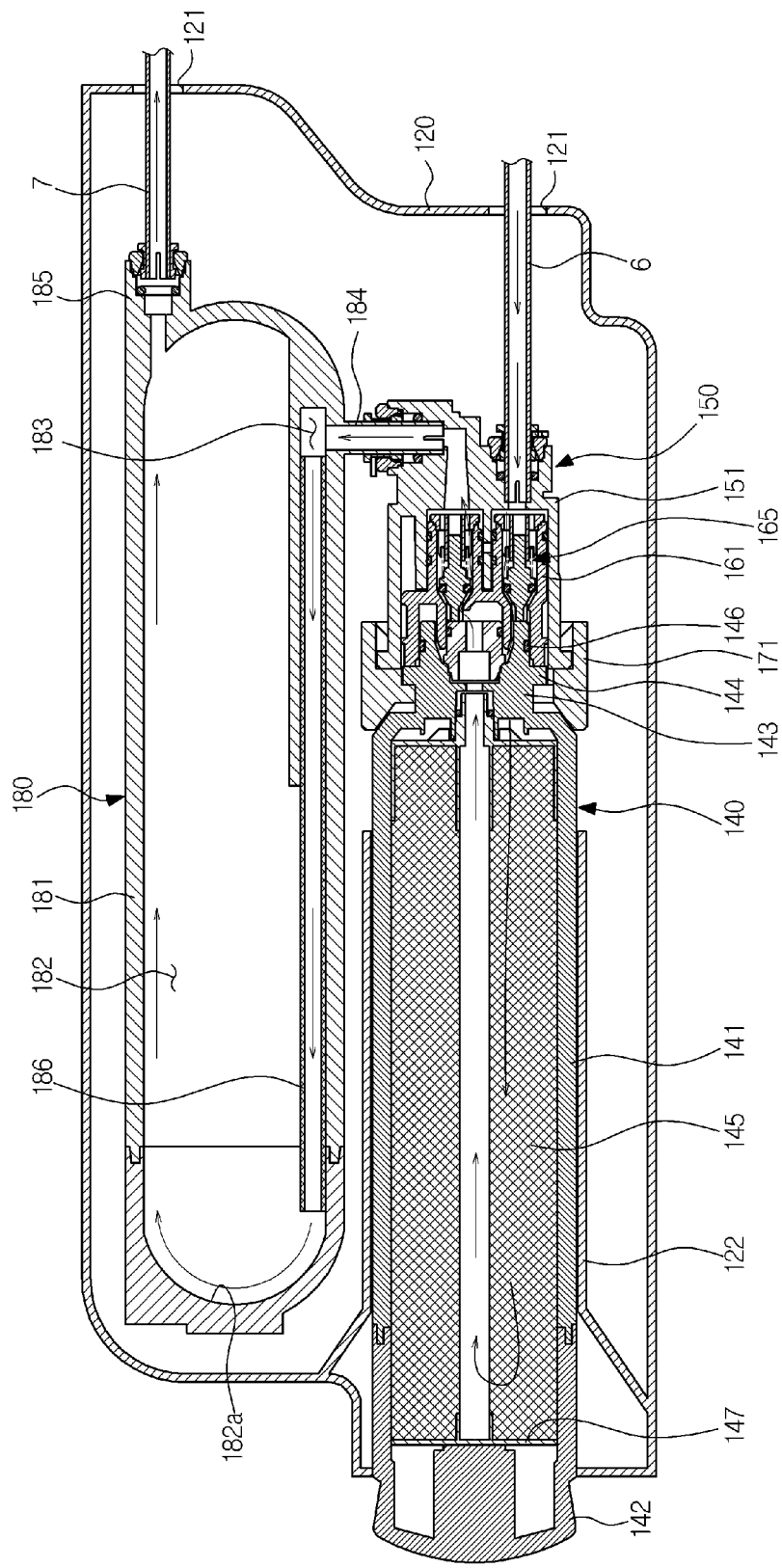

In the embodiment illustrated in FIG. 5, a procedure of supplying water from the external water supply source to the ice maker and dispenser will also be described, with reference to FIG. 11.

Water supplied from the external water supply source 5 is first introduced into the filter unit 130 via the supply tube 6. In this case, the water supplied from the external water supply source 5 may be introduced into the water filter assembly 140 via the first inlet passage 153 and first communicating passage 162 because the water supply tube 6 is in a state of being connected to the first inlet 152 of the filter head assembly 150.

The water introduced into the water filter assembly 140 is purified by the water filter assembly 140, and then discharged through the first outlet 156 of the filter head assembly 150 after passing through the second communicating passage 163 and first outlet passage 157.

The water discharged through the first outlet 156 of the filter head assembly 150 is introduced into the storage space 182 of the storage tank 181 via the second inlet passage 184 and inlet pipe 186 of the storage tank unit 180. In this case, the water introduced into the storage space 182 via the inlet pipe 186 is directed to the round front side of the storage space 182. Accordingly, it may be possible to prevent the storage tank 181 from being damaged due to the pressure of the supplied water.

The water introduced into the storage tank 181 is stored in the storage tank 181, and then flows through the discharge tube 7. The water flowing through the discharge tube 7 is fed to the ice maker 3 and dispenser 4.

In this case, water supplied to the storage tank 181 is stored in the storage tank 181, starting from a front side 182a of the storage space 182, by virtue of the inlet pipe 186. As a result, through the outlet 85 opposite to the front side 182a of the storage space 182, water already stored in the storage tank 181 in the vicinity of the outlet 85 and cooled by cold air supplied to the storage chamber is discharged.

In each of the refrigerators according to the above-described embodiments, water supplied from the external water supply source 5 is supplied to the ice maker 3 and dispenser 4 after being purified by the water filter device 10, which includes the filter unit 30 or 130 and the storage tank unit 60 or 180 are held in an integrated state in the case 20 or 120.

Accordingly, the water filter device 10 may achieve an improvement in assemblability and a reduction in material costs and labor costs in that the filter unit 30 or 130 and the storage tank unit 60 or 180 are held in the case 20 or 120, as compared to the conventional case in which the storage tank unit is separate from the filter unit.

In the refrigerator according to one of the above-described embodiments, it may be possible to supply a water portion, cooled by cold air, of the water stored in the storage tank 181, earlier than the remaining water portion, because water is supplied to the storage tank 181 through the inlet pipe 186.

In the refrigerator according to each of the above-described embodiments, it may be possible to prevent the storage tank 181 from being damaged due to the pressure of water supplied to the storage tank 181 through the inlet pipe 186, because the front side of the storage space 182 has a round shape.

In the refrigerator according to one of the above-described embodiments, even when the pressure of water supplied to the water filter device is low, the second body 161 of the filter head assembly 150 may move within the first body 151 because the filter head assembly 150 includes the second elastic member 175.

Figure 14:
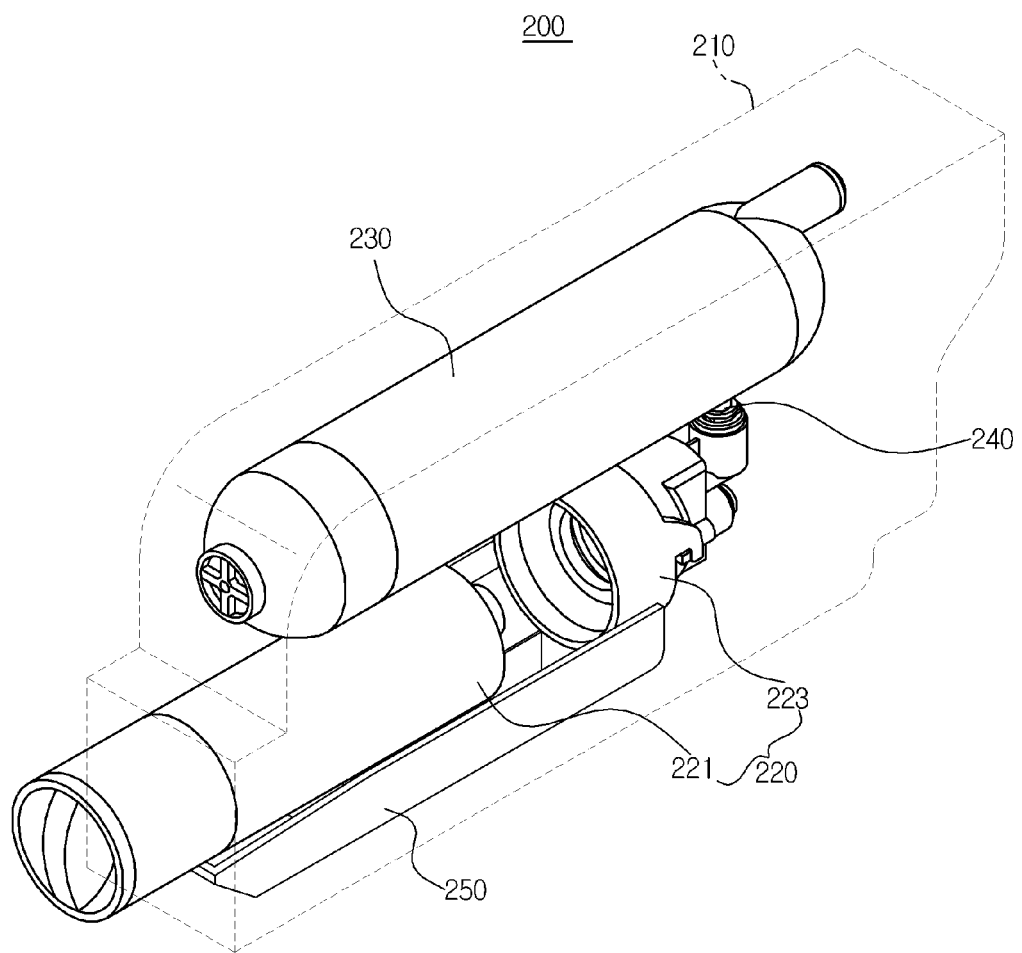
FIG. 14 is a perspective view illustrating a water filter device in a refrigerator according to another embodiment of the present invention.
Figure 15:
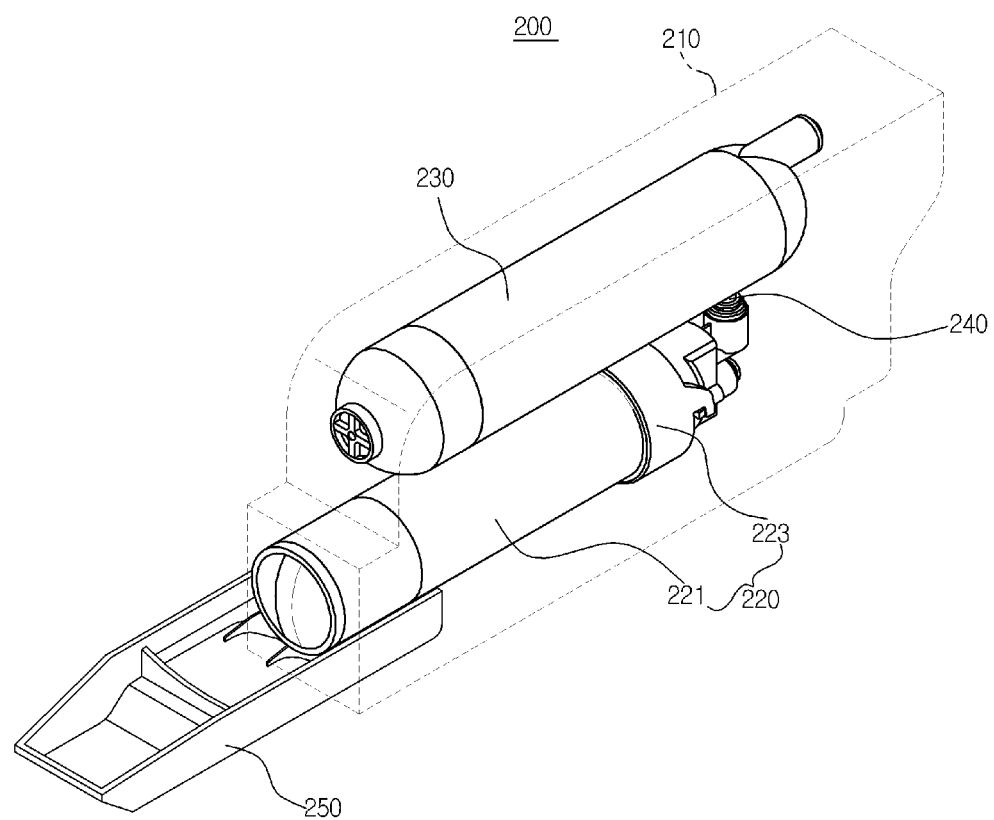
FIG. 15 is a perspective view illustrating an extended state of a water basin shown in FIG. 14.

FIG. 14 is a perspective view illustrating a water filter device in a refrigerator according to another embodiment of the present invention. FIG. 15 is a perspective view illustrating an extended state of a water basin shown in FIG. 14. In the following description, the same reference numeral is assigned to the same constituent elements as those of the previous embodiments, and no detailed description will be given of the same constituent elements.

Referring to FIG. 14, the water filter device 200 in the refrigerator according to this embodiment includes a case 200 to define an outer appearance of the water filter device 200, a filter unit 220 to purify water supplied from an external water supply source 5 to the water filter device 200, and a storage tank unit 230 to store water purified by the filter unit 220.

The filter unit 220 and storage tank unit 230 are received in the case 210. The filter unit 220 and storage tank unit 230 are connected by a connecting tube 240.

The filter unit 220 includes a water filter assembly 221 separably received in the case 210, and a filter head assembly 223 separably coupled to the water filter assembly 40.

The water filter device 200 may further include a water basin 250 to receive water leaking from the filter head assembly 223 when the water filter assembly 221 is separated from the filter head assembly 223.

The water basin 250 is arranged beneath the filter unit 220 in a state in which the water basin 250 is received in the case 210. As shown in FIG. 15, the water basin 250 may be separable from the case 210.

In accordance with this configuration, it may be possible to prevent the water filter device 220 from being contaminated by water collected into the case 210 after leaking from the filter head assembly 223 when the water filter assembly 221 is replaced by a new one.

As apparent from the above description, the refrigerator described above achieves an enhancement in assemblability and a reduction in labor costs and manufacturing costs as it includes a water filter device, in which a filter unit and a storage tank unit are received in a case.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A refrigerator, comprising:
 a cabinet having a storage chamber; and
 a water filter unit to receive water from a water supply source and to supply water filtered by a filter, the water filter unit comprising:
  a storage tank to store water; and
  an assembly including:
   a housing having an inlet and an outlet, the housing providing an inner space within the housing; and
   a head configured to open a first water path between the inlet and the outlet by linearly moving without rotation from a first position to a second position within the inner space and to open a second water path between the inlet and the outlet through the filter by linearly moving without rotation from the second position to the first position within the inner space,
  wherein the head is moved to the first position when the filter is inserted to the assembly, and the head is moved to the second position when the filter is removed from the assembly.

2. The refrigerator according to claim 1, wherein the assembly further comprises:
 an elastic member to push the head toward the second position.

3. The refrigerator according to claim 1, wherein the storage tank comprises:
 a body, and
 a cap configured to overlap with the body when the cap is connected to the body.

4. The refrigerator according to claim 1, wherein the housing includes a connecting portion to connect with the filter and to guide the filter to be rotated and moved linearly toward the first position.

5. The refrigerator according to claim 1, wherein the head comprises:
 a blocking part configured to be inserted between an inlet connecting part and an outlet connecting part of the filter when the filter is connected to the head.

6. The refrigerator according to claim 1, wherein the assembly further comprises:
 a holding member arranged to support at least a part of the filter when the filter is connected to the assembly.

7. The refrigerator according to claim 1, wherein the assembly is directly connected to the storage tank.

8. The refrigerator according to claim 1, wherein the storage tank is positioned above the filter when the filter is inserted to the assembly.

9. The refrigerator according to claim 1, wherein the filter and the storage tank have cylindrical cross sections.

10. The refrigerator according to claim 1, wherein an outlet of the assembly and an inlet of the storage tank are connected by a connector line elongated vertically.

11. The refrigerator according to claim 1, wherein the filter and the storage tank are vertically stacked inside the water filter unit when the filter is inserted to the assembly.

12. The refrigerator according to claim 1, wherein the water from the water supply source is supplied to the storage tank, by bypassing the filter, when the head is retracted to open the first water path.

13. The refrigerator according to claim 1, wherein the filtered water is supplied to the storage tank when the head is extended to open the second water path.

14. A refrigerator, comprising:
 a storage tank to store water; and
 a water path controller comprising:
  a housing to receive a filter for filtering water, the housing having an inlet through which to receive water from an external source and an outlet through which to supply water to the storage tank; and
  a head configured to:
   open a first water path between the inlet and the outlet when the filter is removed from the housing, by moving in a direction of removal of the filter from the housing without rotation; and
 open a second water path between the inlet and the outlet through the filter when the filter is inserted to the housing, by moving in a direction of insertion of the filter to the housing without rotation.

* * * * *